Oct. 20, 1931.  M. R. BUTLER  1,828,458
MATERIAL HANDLING EQUIPMENT
Filed Feb. 11, 1929  3 Sheets-Sheet 1
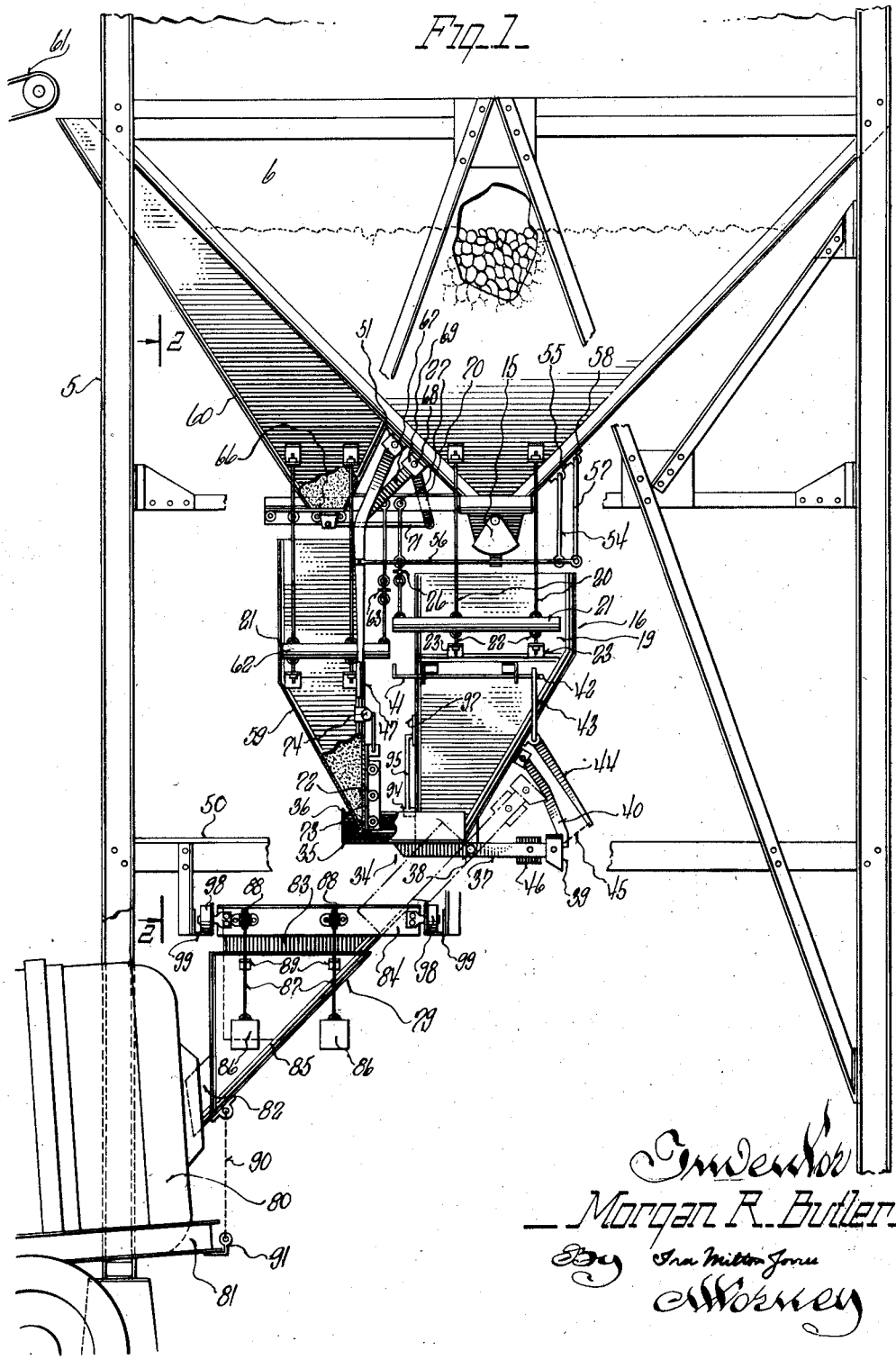

Oct. 20, 1931.  M. R. BUTLER  1,828,458
MATERIAL HANDLING EQUIPMENT
Filed Feb. 11, 1929  3 Sheets-Sheet 2
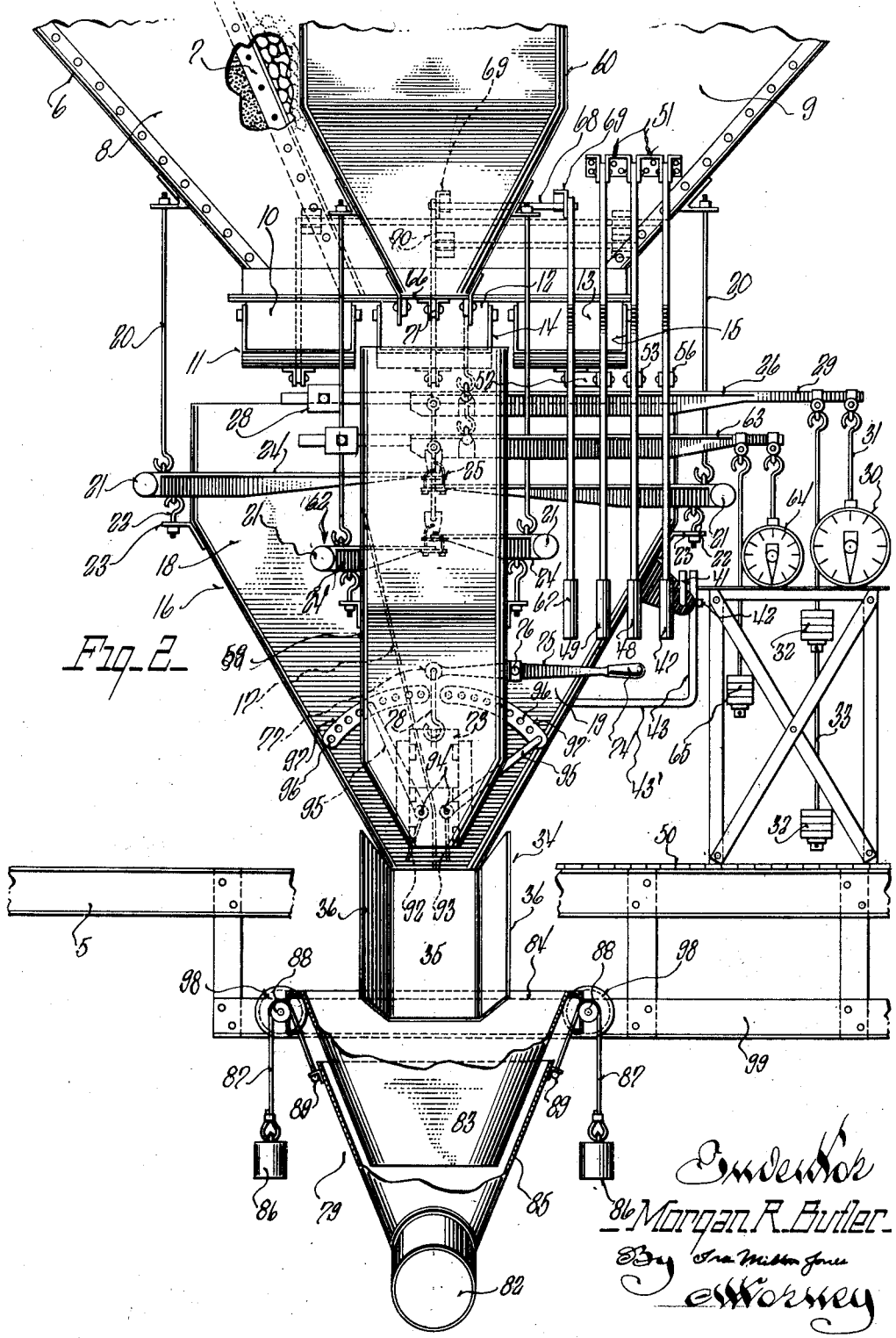

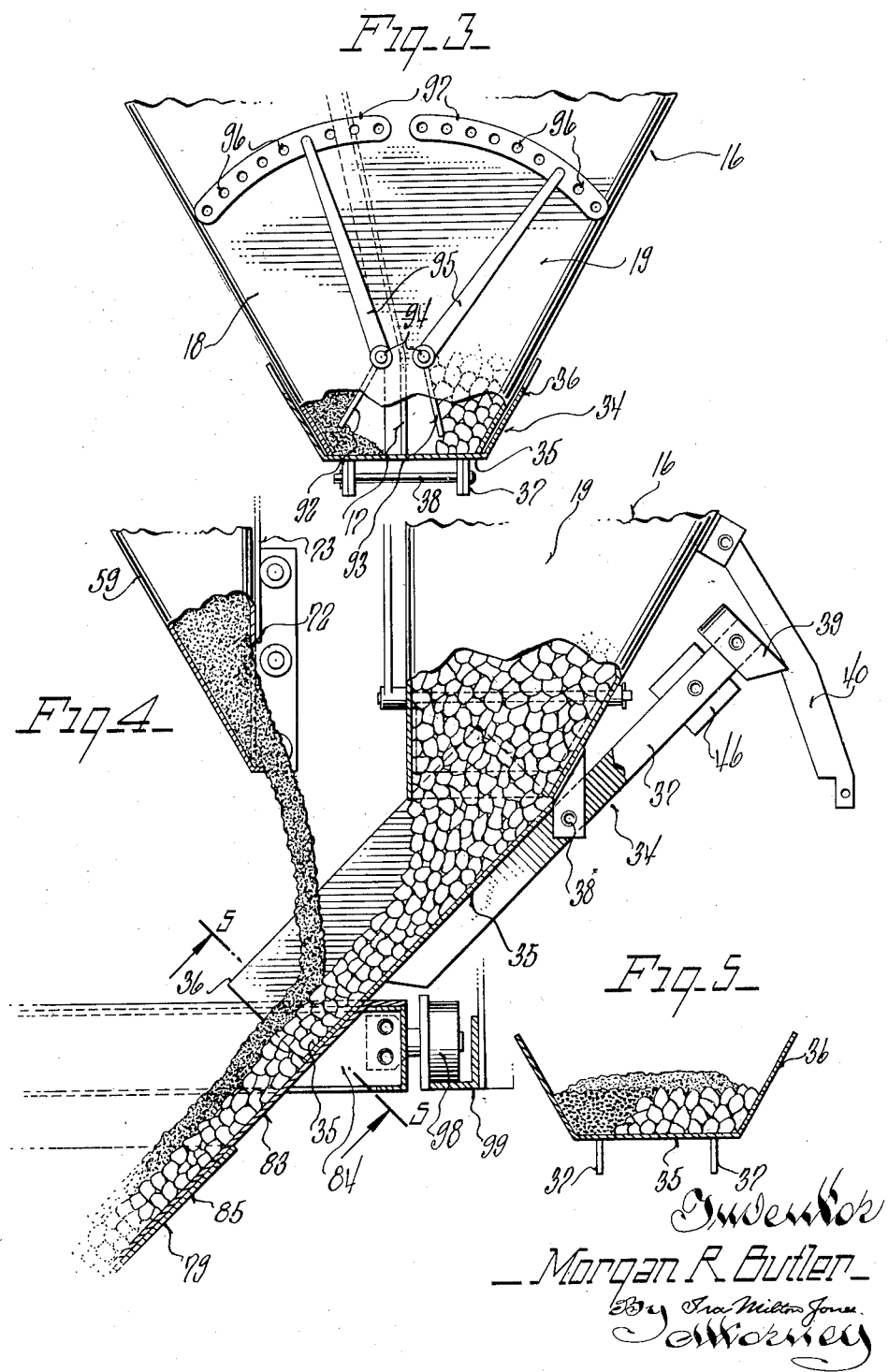

Patented Oct. 20, 1931

1,828,458

UNITED STATES PATENT OFFICE

MORGAN R. BUTLER, OF WAUKESHA, WISCONSIN

MATERIAL HANDLING EQUIPMENT

Application filed February 11, 1929. Serial No. 339,080.

This invention relates to certain new and useful improvements in material handling equipment and refers more particularly to a device for measuring sand, gravel and cement to be simultaneously discharged into a cement mixer or the like.

In devices of this nature where cement, sand and gravel are simultaneously discharged into a mixing device, it is important that the cement be prevented from sticking to the walls of the discharge chutes and associated parts as this not only impedes and hinders efficient operation but also very often causes the ingredients to be delivered to the mixing device in improper proportions.

It is, therefore, an object of this invention to provide a device of the character described which has means for simultaneously discharging gravel, sand and cement in such a manner that the cement is prevented from coming in contact with the walls of the discharge member.

Another object of this invention resides in the provision of means for regulating the flow of materials from the several measuring hoppers whereby the predetermined proportion of materials is maintained throughout the discharge and all of the hoppers are emptied within the same period of time, and whereby the combined volume of materials discharged from the several hoppers is controlled to prevent choking of the discharge member.

A more specific object of this invention resides in the provision of a combined sand and gravel measuring hopper supported beneath a supply bin and having a cement measuring hopper supported adjacent thereto, the discharges of the several hoppers being arranged so that the sand and gravel enters the discharge member prior to the cement, which falls onto the discharging sand and gravel to be carried thereby and thus prevented from coming in contact with the walls of the discharge member.

With the above and other objects in view which will appear as the description proceeds, my invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawings I have illustrated one complete example of the physical embodiment of my invention constructed according to the best mode I have so far devised for the practical application of the principles thereof, and in which:

Figure 1 is an elevational view of the device embodying my invention with parts broken away and in section to illustrate structural details;

Figure 2 is an enlarged, fragmentary, elevational view, taken on the plane of the line 2—2 of Figure 1;

Figure 3 is a fragmentary, detail view illustrating the manner of regulating the rate of discharge from the sand and gravel measuring hoppers;

Figure 4 is an enlarged, detail view illustrating the manner in which the materials of the several hoppers are simultaneously discharged into a common discharge member; and Figure 5 is a cross sectional view taken through the discharge member on the plane of the line 5—5 of Figure 4.

Referring now more particularly to the accompanying drawings in which like numerals designate like parts throughout the several views, the numeral 5 represents a suitably fabricated supporting frame, only a portion of which has been illustrated for clearness, and whose upper portion mounts a supply bin 6. A partition 7 divides the bin 6 into a compartment 8 adapted to receive sand and a compartment 9 adapted to receive gravel. The contents of the compartment 8 may be discharged through an outlet 10 closed by a gate 11 and the contents of the compartment 9, may be discharged through outlets 12 and 13 closed by similar gates 14 and 15.

The gates 11, 14 and 15 are of conventional construction and are opened in a manner to be later described, to discharge the contents of their respective compartments into a compound measuring hopper 16 divided by a partition 17 into a sand measuring hopper 18 and a gravel measuring hopper 19. The compound hopper 16 is supported through a scale, of conventional construction, from the bin 6 by means of a plurality of supporting rods 20 the lower ends of which are connected with cross bars 21 of the scale through levers, not shown, extending a slight distance inwardly of the cross bars. Other, slightly longer levers or arms, not shown, carry hooks 22 whose lower ends are connected with the hopper 16 through bracket members 23 fixed to the walls of the hopper.

Also extended inwardly from one end of the cross bars 21 are arms 24 whose outer ends are freely movably supported, as at 25, from the inner end of a pivoted arm 26. The arm 26 forms the beam of the scale and is pivotally supported at a point adjacent its connection with the arms 24, from a portion of the fabricated frame, as at 27, see Figure 1. The short end of the beam 26 is provided with a weight 28 and the outer portion of the long end 29 is connected with a scale dial 30 through a link 31, balance weights 32 also being suspended from the end 29 of the beam by means of a rod 33. This scale construction is of conventional design and forms no part of this invention and, therefore, it has not been shown in detail and further description thereof is deemed to be unnecesary.

The lower end of the compound hopper 16 merges to provide restricted discharge openings for the hoppers 18 and 19 which are simultaneously closed and opened by a gate structure 34 whose construction is similar to that shown and described in my co-pending application Serial No. 333,680. The gate structure 34 has a plate 35 provided with sides 36, which when in open position forms a chute for the materials being discharged from the hoppers 18 and 19, and which is supported by arms 37 pivoted from a fixed support, as at 38. The outer ends of the arms 38 are connected by a cross piece 39 which is engageable by a latch member 40 to hold the gate structure in either closed or opened position as clearly described in the application above referred to.

When in closed position, as illustrated in Figure 1, a stop formed on the latch 40 engages the upper edge of the member 39 and when in open position, as shown in dotted lines in Figure 1, and in Figure 4, the lower edge of the member 39 engages a second stop formed on the latch 40.

Opening and closing of the gate structure is accomplished entirely by gravity by merely tripping the latch 40. Tripping of the latch 40 is accomplished by means of a slidably mounted handle member 41 whose inner end 42 engages behind the free end of an upwardly directed arm 43 extended from a horizontal pivoted bar 43', to which a lever 44 is fixed. The outer free end of the lever 44 is connected with the latch 40 through a chain or the like 45, so that a pull on the handle 41 actuates the lever 44 to move the latch out of engagement with the gate structure permitting the weight of the material in the hoppers, when the gate is closed, to move the same to its open position where it is held by the latch 40 as illustrated in dotted lines in Figure 1. The return of the gate to closed position is accomplished in the same manner, i. e., by again tripping the latch 40 to permit a weight 46 carried by the gate structure to close the same as will be readily apparent.

As has been stated, the hoppers 18 and 19 are adapted to be filled from the compartments 8 and 9 of the bin 6 through the discharge openings 10, 12 and 13 upon opening of their respective gates 11, 14 and 15. Opening of the gates 11, 14 and 15 is effected upon actuation of levers 47, 48 and 49, respectively, in the following manner. The levers 47, 48 and 49 are conveniently "banked" at a point adjacent the gate operating handle 41 to be accessible to an operator standing upon a platform 50, and are pivoted at their upper ends from supports 51 fixed to the adjacent wall of the bin 6.

The lever 49 is connected with the gate 15 through a connecting link 52 and the lever 48 is connected with the gate 14 through a connecting link 53 pivoted to the lever at a medial point and connected at its opposite end with the downwardly directed portion 54 of a U-shaped member pivotally mounted from the bin 6 by bearings 55. The other downwardly directed end of the U-shaped member is in line with the center of the gate 14 and has its free end connected therewith through a suitable link or connecting rod. The lever 47 is connected with the gate 11 in a similar manner, having one end of a connecting rod or link 56 pivotally connected therewith at a medial point and whose opposite end is pivotally connected with the end of one arm of a U-shaped lever member 57 pivotally supported from the bin 6 at its horizontal portion by bearings 58. The other downwardly extended arm of the U-shaped member is in alignment with the center of the gate 11, with which it is connected through a suitable link or connecting rod. In this manner the controls for the gates 11, 14 and 15 are conveniently centralized.

Mounted to one side of the compound hopper 16 is a cement measuring hopper 59 which is filled from a supply bin 60 fixed to the adjacent wall of the bin 6 and adapted to be filled in any suitable manner as by a conveyor, a portion of which is illustrated as at 61, leading from a convenient place of storage for the cement. The hopper 59 is supported from the supply bin 60 through a scale device 62, the construction of which is identical to that described in connection with the support for the hopper 16, and whose beam 63 is connected with a scale dial 64 and carries balance weights 65.

The discharge of the cement from the supply bin 60 to the measuring hopper 59 is controlled by a sliding gate 66 adapted to be opened upon actuation of a lever 67. The lever 67 is fixed, at its upper end, to a transverse rod 68, pivotally mounted from the adjacent wall of the bin 6 by bearings 69, to be oscillated upon actuation of the lever. The opposite end of the transverse rod 68 has a lever 70 fixed thereto, the outer free end of which is connected with the sliding gate 66 through a connecting link 71 so that oscillation of the transverse rod by means of the handle 67 moves the gate 66 to open and closed position.

The lower end of the cement measuring hopper 59, like the hopper 16, converges to provide a restricted outlet opening 72 which is adapted to be closed by a sliding gate 73. The gate 73 is movable vertically to open and closed position upon actuation of a handle 74 formed on the outer end of a lever 75 pivoted at a medial point to a fixed support 76 carried by the hopper 59, and connected at its opposite end 77 with the gate 73, through a connecting link 78.

The contents of the hoppers 18, 19 and 59 are adapted to be simultaneously discharged into a member 79 from where the materials are discharged into the mixing chamber 80 of a transit mixer or the like which is usually mounted upon a vehicle chassis 81 and is backed into position with its opening aligned with the discharge 82 of the member 79. The member 79 consists of a fixed funnel shaped unit 83 movable with a carriage 84, for a purpose to be later described, and whose open lower end communicates with a second unit 85 in which the unit 83 is nested. The unit 85 is vertically movable toward and away from the unit 83 and is normally supported adjacent thereto by weights 86 connected with the unit 85 through cables 87 trained about pulleys 88 carried by the carriage 84, and fixed to the unit 85, as at 89.

With the transit mixer in position, the gates 34 and 73 are opened to permit the simultaneous discharge of the contents of all of the hoppers, which are directed into the member 79 by the open gate 34. As the weight of the materials entering the transit mixer causes its supporting springs to sag, the movable unit 85 of the member 79 is connected with the chassis 81 by means of a chain 90 whose lower end 91 is hooked onto a portion of the chassis, to move with the mixer against the action of its counterweights 86, to maintain the discharge 82 in alignment with the mixer.

As the walls of the discharge member 79 and the plate 35 are usually wet, it is desirable to prevent the cement from coming in contact therewith, as to do so would cause the same to stick to the walls and thus impede the proper discharge of the materials and their delivery to the mixer in improper proportions.

In the present invention, the cement is prevented from coming in contact with the walls of the discharge member 79 and with the chute formed by the plate 35 of the gate structure 34 in the following manner:

As the operator opens the gate 34, the sand and gravel from the hoppers 18 and 19 drops onto the open gate and covers the entire bottom thereof with the sand and gravel following down the chute roughly side by side as illustrated in Figure 5. After the gate 34 is opened, the operator opens the gate 73 of the cement hopper 59 a desired amount, permitting the cement to discharge from the hopper, which falls onto the downwardly moving sand and gravel in substantially a ribbon as illustrated in Figure 4 to drop onto the sand and gravel and be carried thereby through the discharge member 79 without at any time coming in contact with its walls.

Inasmuch as it is desirable to maintain the uniform proportions of materials throughout the entire discharge thereof, the hoppers 18 and 19 are provided with gates 92 and 93, respectively, whereby the rate of flow of the material from the hoppers is readily controllable. The gates 92 and 93 are mounted adjacent the discharge opening of the hoppers and are fixed to transverse rods 94 pivoted in aligned apertures in the opposite walls of the hopper. Arms 95 fixed to one end of each rod provide means whereby their respective gates may be opened or closed. The outer ends of the arms are engageable in apertures 96 formed in segments 97 fixed to the adjacent wall of the hopper 16 to maintain the gates in any predetermined position of adjustment.

In this manner the operator is enabled to adjust the rate of flow of the sand and gravel to accommodate different types of material and to insure the emptying of the hoppers within the same period of time and the gate 73 of the cement hopper being likewise adjustable to any predetermined open position, permits its rate of discharge to be adjusted accordingly so that its contents also may be emptied within the predetermined period of time.

The discharge member 79 is carried by the movable carriage 84 to permit its movement to one side of the hoppers to accommodate the positioning of a vehicle or the like directly beneath the hoppers 18, 19 and 59 so that their contents may be emptied directly into the vehicle, as will be readily apparent. The carriage 84 is supported by wheels 98 which ride on tracks 99 suitably supported from the fabricated frame structure.

From the foregoing description taken in connection with the accompanying drawings it will be readily apparent to those skilled in the art to which an invention of this character appertains that I provide an improved device for measuring and simultaneously discharging a plurality of different materials, and in which the relative proportion of the materials is maintained throughout the entire discharge.

I claim:

1. In a device of the character described, including a plurality of hoppers for receiving different materials and discharges leading from the hoppers to a common receptacle, a single means for closing all of said discharges and whereby upon being opened the different materials from the hoppers may be simultaneously discharged into the receptacle, and means independent of the means for closing the discharges for adjusting the areas of the discharges whereby the different materials retain a predetermined proportion throughout their discharge.

2. In a device of the character described including a plurality of material receiving hoppers of different predetermined capacities and means within the hoppers for discharging the contents of the hoppers, means for adjusting their rate of discharge so that the contents of all the hoppers are discharged within substantially the same period of time.

3. In a device of the character described, a plurality of hoppers, the capacities of which bear a predetermined relative proportion to each other, a discharge member, means for adjusting the rate of discharge of the contents from their respective hoppers whereby the contents of the hoppers passing through the discharge member maintain their predetermined relative proportion throughout their passage through the discharge member, and means mounting the hoppers in such relative positions that the contents of one hopper falls on the discharging contents of the other hoppers and is thereby maintained out of contact with the discharge member walls.

4. A device for simultaneously supplying several ingredients of a mixture to a mixing device or the like, comprising means for measuring the volume of the ingredients in accordance with a predetermined relative proportion, means for simultaneously conducting the materials from the measuring means to the mixing device or the like, and means within the measuring means for regulating the rate of discharge therefrom whereby the predetermined proportion of the ingredients is substantially maintained throughout their discharge into the mixing device or the like.

5. In a device of the character described, a plurality of measuring hoppers adapted to receive sand, gravel and cement to be simultaneously discharged into a mixing machine, the capacity of the measuring hoppers being such as to measure the sand, gravel and cement in their proper relative proportion, a discharge member mounted below the measuring hoppers, means for simultaneously discharging the sand, gravel and cement into the discharge member through which it passes to the mixing machine, and means mounting the hopper for the cement with its discharge above the path of the discharging sand and gravel whereby the sand and gravel cover the bottom of the discharge member and the cement falls onto the sand and gravel and is maintained out of contact with the walls of the discharge member.

6. In a device of the character described, a plurality of material receiving hoppers arranged with their discharge openings adapted to discharge their contents into a common receptacle, means for supplying different materials to the hoppers, means normally closing the discharge openings of the hoppers and operable to direct the simultaneous discharge of the contents of all of the hoppers into the receptacle, and gate members for regulating the rate of discharge of the material from the individual hoppers.

7. In a device of the character described, a plurality of measuring hoppers adapted to receive different materials and having their discharge openings adjacent each other, storage hoppers above the measuring hoppers from which the measuring hoppers may be filled, a member normally closing the discharge openings of said hoppers and adapted upon opening to simultaneously discharge the contents of the hoppers into a receptacle, another measuring hopper adapted to receive still another material and arranged with its discharge opening above the member normally closing the discharge openings of the other hoppers, whereby said other material falls onto the discharging materials from the other hoppers and is conveyed thereby into the receptacle, and means for regulating the rate of flow of said other material.

8. In a device of the character described, a plurality of measuring hoppers adapted to receive different materials, storage means above said hoppers from which they may be filled, some of said hoppers having their discharge openings adjacent each other, a pivotally mounted member adapted to normally close said adjacent discharge openings, said pivotally mounted member being movable to open position and forming a chute for the materials discharged from said openings to direct the same into a common receptacle, and another of said hoppers being arranged with its discharge opening spaced from the discharge openings of the other hoppers but above the pivoted member whereby the material therein falls onto the discharging materials of the other hoppers as they pass into the receptacle to be conveyed thereby into the receptacle.

9. In a device of the character described, a plurality of adjacent measuring hoppers having their discharge ends converging toward a common point and having their discharge openings adjacent each other, said hoppers being of different sizes and adapted to receive different materials, a pivoted member normally closing the discharge openings of the hoppers and adapted upon being moved to open position to simultaneously discharge all the materials from the hoppers into a common receptacle, and a gate valve within each hopper for regulating the rate of discharge of its material so that all hoppers will be emptied within the same period of time.

10. In an apparatus for loading a vehicle supported receptacle having a relatively restricted inlet opening, an elevated bin having a discharge, a movable discharge member spaced from said bin and arranged to receive material therefrom and to direct said material into the inlet opening of the vehicle carried receptacle, said vehicle carried receptacle lowering as it fills, and means operable by the lowering of the receptacle for moving the discharge member to maintain it in a predetermined position with respect to the inlet opening.

11. In an apparatus for loading a vehicle supported receptacle having a relatively restricted inlet opening, an elevated bin having a discharge, a movable discharge member spaced from said bin and arranged to receive materials therefrom and to direct said materials into the inlet opening of the vehicle carried receptacle, part of the vehicle and the receptacle carried thereby lowering as the receptacle is filled, and a connection between said part of the vehicle and the discharge member for moving the discharge member as the vehicle part and the receptacle carried thereby lowers to maintain the discharge member in operative relation to the restricted inlet opening of the receptacle.

12. In an apparatus for loading a vehicle supported receptacle having a relatively restricted inlet opening and a member for directing material into said restricted inlet opening, means mounting said member in an elevated position with a part thereof movable substantially vertically, part of the vehicle and the receptacle carried thereby lowering as the receptacle is filled, and a connection between said substantially vertically movable discharge member part and said part of the vehicle whereby the lowering of the vehicle part carries the discharge member part with it to maintain the same in proper relation to the inlet opening of the receptacle.

13. In an apparatus for loading a vehicle supported receptacle having a restricted inlet opening, an elevated supply bin having a discharge, a two part discharge member arranged beneath the bin to receive material therefrom and to direct the material into the inlet opening of the vehicle carried receptacle, one part of said discharge member being telescoped over the other and being movable substantially vertically away from the other part, means normally maintaining the movable discharge member part in raised position telescoped over the other part, said movable discharge member part having a discharge opening adapted to align with the restricted inlet opening of the vehicle carried receptacle, and a connection between said movable discharge member part and a part of the vehicle carrying the receptacle whereby the movable discharge member part is lowered in correspondence with the lowering of the vehicle carried part as the receptacle is filled.

In testimony whereof I have hereunto affixed my signature.

MORGAN R. BUTLER.

CERTIFICATE OF CORRECTION.

Patent No. 1,828,458.  Granted October 20, 1931, to

MORGAN R. BUTLER.

It is hereby certified that error appears in the printed specification of the above numbered patent requiring correction as follows: Page 4, line 28, claim 2, strike out the words "within the hoppers" and insert the same to follow the word "means" in line 29, same claim; and that the said Letters Patent should be read with this correction therein that the same may conform to the record of the case in the Patent Office.

Signed and sealed this 15th day of December, A. D. 1931.

(Seal)

M. J. Moore,
Acting Commissioner of Patents.